United States Patent [19]
Novacek

[11] Patent Number: 4,936,094
[45] Date of Patent: Jun. 26, 1990

[54] TORQUE-GENERATING STEERING DEVICE WITH LOAD-SENSING CAPABILITY

[75] Inventor: William J. Novacek, Bloomington, Minn.

[73] Assignee: Eaton Corporation, Cleveland, Ohio

[21] Appl. No.: 297,643

[22] Filed: Jan. 17, 1989

[51] Int. Cl.⁵ .............................................. B62D 5/08
[52] U.S. Cl. ........................................ 60/384; 60/393; 180/132; 180/149; 418/61.3
[58] Field of Search .................... 180/132, 146, 149; 418/61.3; 60/384, 385, 393, 445, 452; 91/370; 137/625.24, 596.13

[56] References Cited

U.S. PATENT DOCUMENTS

Re. 25,291  12/1962  Charlson .
4,023,646   5/1977   Heisig et al. ................... 180/132
4,109,679   8/1978   Johnson ........................ 60/384 X
4,336,687   6/1982   Morgan .
4,381,905   5/1983   Peterson .

Primary Examiner—Edward K. Look
Attorney, Agent, or Firm—L. J. Kasper

[57] ABSTRACT

A torque-generating steering device is provided for use with a pump (19) having a pressure compensator (23) for varying the output of the pump. The device includes a gerotor displacement means (43) which provides a relatively high-torque output to an output shaft (29) in response to the flow of fluid through the gerotor. A spool valve (73) and sleeve valve (75) define a fluid path (119) from an inlet port (13) through the gerotor to an outlet port (15). The fluid path includes a main variable flow control orifice (121) in series flow between the inlet and the gerotor, the orifice having a zero flow area when the spool and sleeve are in their neutral position, and a maximum flow area when the spool and sleeve are in an operating position. The device defines a load-sensing port (115) communicating with the pressure compensator (23) and with the fluid path (119), downstream of the orifice (121).

13 Claims, 4 Drawing Sheets

4,936,094

TORQUE-GENERATING STEERING DEVICE WITH LOAD-SENSING CAPABILITY

BACKGROUND OF THE DISCLOSURE

The present invention relates to torque-generating steering devices, and more particularly, to such devices in which a relatively low-torque input is translated into a relatively high-torque steering output, with the aid of a source of pressurized fluid.

Torque generators of the type to which the present invention relates have been in commercial use for many years, and are illustrated and described in greater detail in U.S. Pat. No. Re. 25,291, assigned to the assignee of the present invention and incorporated herein by reference.

Torque generators include a valve means which is displaced from a neutral position to an operating (open) position by rotation of the steering wheel. When the valve means is open, pressurized fluid flows through the valve means and into a fluid pressure actuated displacement mechanism, such as a gerotor gear set, thereby generating a relatively high-torque steering output which is transmitted by means of an output shaft to a steering apparatus, such as the pinion gear of a rack and pinion device. Although the torque generator of the present invention may be used in various applications, it is especially advantageous (and used most commonly) in vehicle steering systems, and will be described in connection therewith.

The prior art torque generator has, as far as is known to applicant, always included valving of the open-center type, such that fluid would flow from the pump through the valving to the system reservoir whenever the torque generator is not being utilized, and the valving is in its neutral position. Although the operation of such open-center torque generators has been generally satisfactory, it has been necessary to provide a second pump in the event the vehicle includes any other hydraulic devices, beside the steering system. The provision of a second pump, and the associated plumbing and controls, on the types of vehicles which normally utilize torque generators becomes prohibitively expensive.

SUMMARY OF THE INVENTION

Accordingly, it is an object of the present invention to provide an improved torque generator which may be utilized on vehicles having multiple hydraulic devices, but only a single pump, wherein the torque generator provides a load-pressure signal.

The above and other objects of the present invention are accomplished by the provision of a torque-generating steering device of the type described previously comprising a housing means defining a fluid inlet port in fluid communication with the fluid source, and a fluid outlet port. The fluid energy-translating displacement means is associated with the housing means and includes a rotor member having relatively high-torque rotary motion in response to the flow of pressurized fluid through the displacement means. Valve means is disposed in the housing means and has a neutral position and an operating position in which the valve means and the housing means cooperate to define a fluid path communicating pressurized fluid from the inlet port to the displacement means, and from the displacement means to the outlet port. An input shaft is operable to transmit the relatively low-torque input into movement of the valve means from the neutral position to the operating position, and a follow-up means is operable to transmit the rotary motion of the rotor member and the follow-up movement of the valve means from the operating position toward the neutral position. An output shaft is operable to transmit the relatively high torque rotary motion of the rotor member into the relatively high-torque steering output.

The improved torque-generating steering device is characterized by the fluid path including a main variable flow control orifice disposed in series flow relationship between the inlet port and the displacement means, the flow control orifice having a substantially zero flow area when the valve means is in the neutral position, and a maximum flow area when the valve means is in the operating position. The housing means defines a load-sensing port adapted to be in fluid communication with a pressure-responsive means of the fluid source, and the load-sensing port is also in fluid communication with the fluid path, downstream of the main variable flow control orifice.

DESCRIPTION OF THE PREFERRED EMBODIMENT

Figure 1:
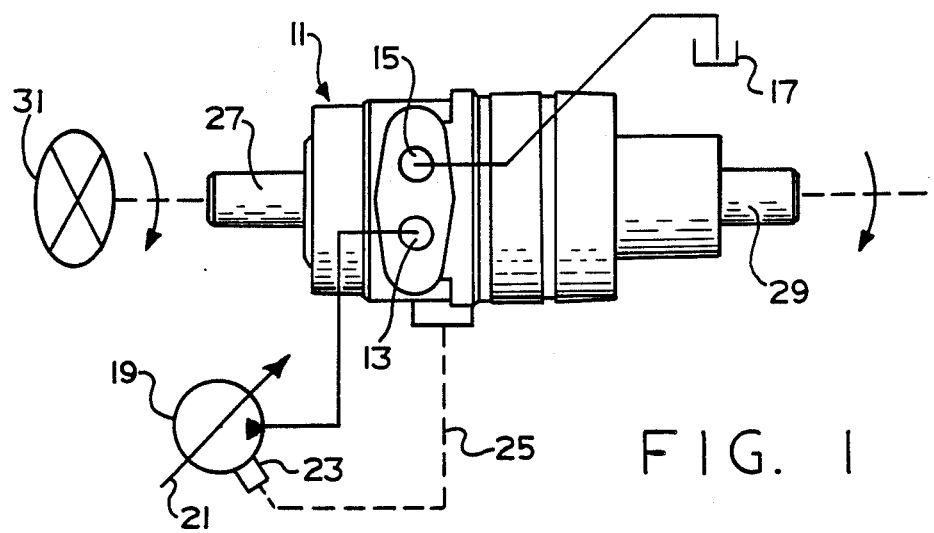
FIG. 1 is a somewhat schematic view of a hydraulic steering system including the torque-generating steering device of the present invention.

Referring now to the drawings, which are not intended to limit the invention, FIG. 1 illustrates somewhat schematically a hydraulic steering system including a torque-generating steering device, generally designated 11 and referred to hereinafter simply as a "torque generator". The torque generator 11 defines an inlet port 13 and an outlet port 15, which is connected to the system reservoir 17. The inlet port 13 is in fluid communication with the outlet port of a variable displacement hydraulic pump 19 which, by way of example only, may have a variable swashplate 21, the position of which determines the flow output of the pump 19, for any particular input speed. The position of the swashplate 21 is determined by a flow and pressure compensator, schematically designated as 23, which receives a load pressure signal 25 from the torque generator 11, as will be described in greater detail subsequently.

The torque generator 11 includes an input shaft 27 and an output shaft 29. Operably connected to the input shaft 27 is a steering wheel 31, whereby a relatively low-torque input is transmitted to the torque generator 11. As is well known to those skilled in the art, the primary function of the torque generator 11 is to receive the relatively low-torque input, and convert that input into a relatively high-torque steering output, which is transmitted by means of the output shaft 29 to any suitable device such as the pinion gear of a rack and pinion steering apparatus (not shown).

Figure 2:
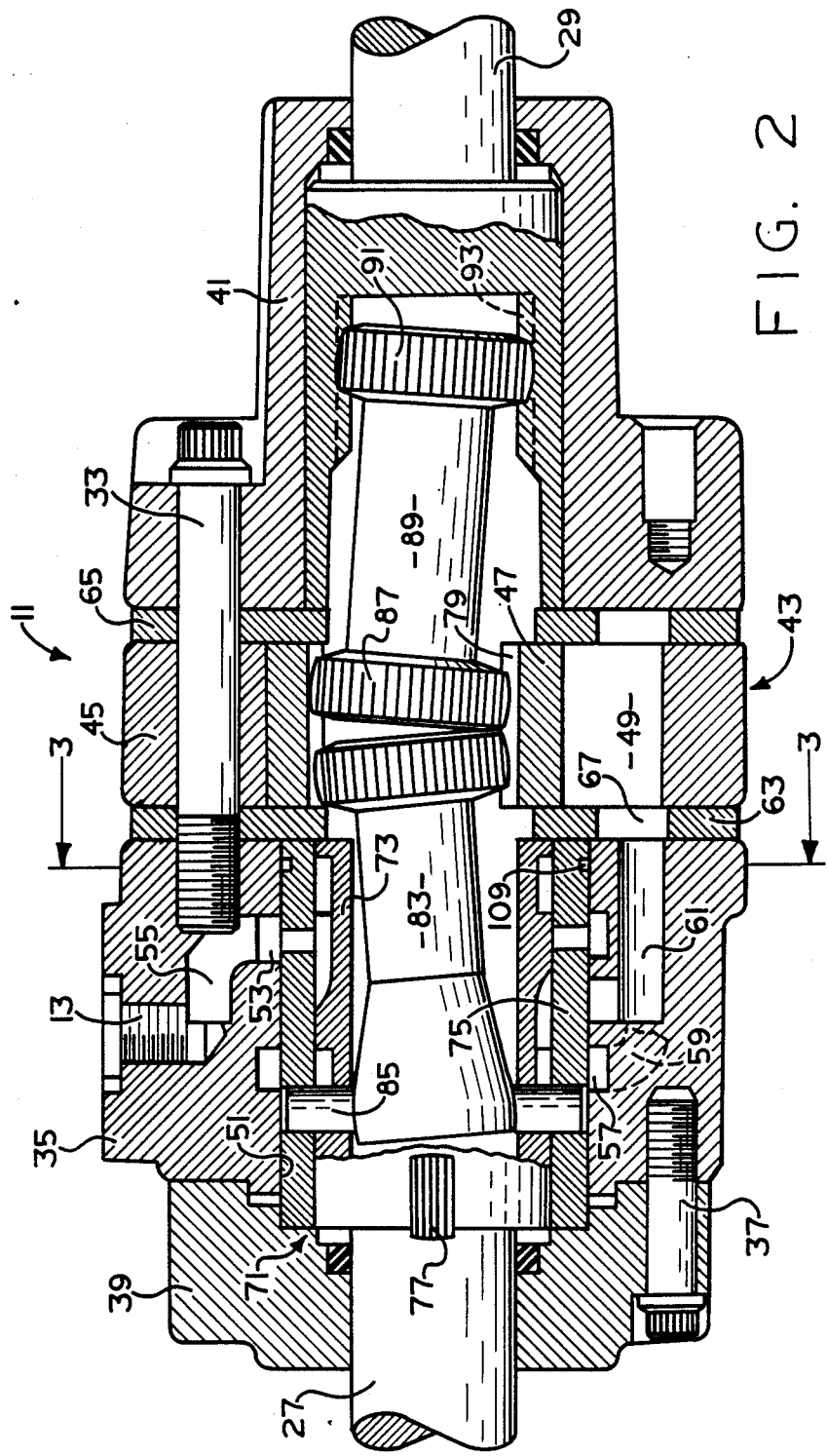
FIG. 2 is an axial cross-section through the torque-generating steering device shown in external plan view in FIG. 1.

Referring now to FIG. 2, the torque generator 11 is comprised of a plurality of sections held in tight sealing engagement by a plurality of bolts 33, only one of which is shown in FIG. 2. The torque generator 11 comprises a valve housing section 35, having attached thereto, by means of a plurality of bolts 37, a front endcap 39, through which the input shaft 27 extends.

At the rearward end of the torque generator 11 (right end in FIG. 2) is a shaft support casing 41, through which the output shaft 29 extends. Disposed between the valve housing section 35 and the shaft support casing 41 is a gerotor displacement mechanism, generally designated 43, comprising an internally-toothed ring member 45 and an externally-toothed star member 47. As is well known to those skilled in the art, but by way of example only, the ring member 45 has a plurality $N+1$ of internal teeth, and the star member 47 is eccentrically disposed within the ring member 45 and has a plurality $N$ of external teeth. The star member 47 orbits and rotates within the ring member 45, and this relative orbital and rotational motion defines a plurality of expanding and contracting fluid volume chambers 49. In the subject embodiment, $N$ is equal to 6, such that the ring member 45 has seven internal teeth, and the star member 47 has six external teeth, such that six orbits of the star within the ring results in one complete revolution of the star.

Referring still to FIG. 2, the valve housing section 35 defines the inlet port 13, as well as the outlet port 15 (not shown in FIG. 2). The housing section 35 defines a cylindrical valve bore 51. The housing section 35 further defines an annular groove 53, which is in fluid communication with the inlet port 13 by means of a passage 55. Similarly, the housing section 35 defines an annular groove 57, which is in open fluid communication with the outlet port 15 by means of a passage 59, shown only in dotted, fragmentary form in FIG. 2. Finally, the housing section 35 defines a plurality of meter passages 61 (see also FIG. 3), each of which is disposed for fluid communication with one of the volume chambers 49.

Disposed between the gerotor 43 and the valve housing section 35 is a port plate 63, and disposed between the gerotor 43 and the shaft support casing 41 is another port plate 65. The port plate 63 defines a plurality of ports 67, each of which is disposed to permit fluid communication between one of the volume chambers 49 and its respective meter passage 61. In the subject embodiment, the port plate 65 defines a plurality of recesses 69 which may be substantially identical to the ports 67, to provide axial pressure balancing of the star member 47, as is well known to those skilled in the art.

Disposed within the valve bore 51 is a valve means, generally designated 71, comprising a primary, rotatable valve member 73 (spool valve), and a relatively rotatable, follow-up valve member 75 (sleeve valve). The spool valve 73 is preferably formed integral with the input shaft 27, for rotation therewith. Passing through the wall of the spool valve 73, and into engagement with the sleeve valve 75 is a plurality of spring members 77, the function of which is to bias the sleeve valve 75 toward a neutral position, relative to the spool valve 73, with the term "neutral" to be described in greater detail subsequently in connection with FIG. 6.

The gerotor displacement mechanism 43 has two primary functions in the torque generator 11. The first is to serve as a fluid meter, in response to the flow of pressurized fluid therethrough, and provide follow-up movement to the sleeve valve 75. In order to accomplish this follow-up function, the star member 47 is provided with a set of internal splines 79, and in engagement therewith is a set of crowned, external splines 81 formed about the rearward end of a driveshaft 83, the forward end of which is bifurcated and engages a pin member 85. The pin member 85 extends through oversized openings in the spool valve 73, in a manner well known in the art, and is received within openings in the sleeve valve 75, such that orbital and rotational motion of the star 47 is transmitted into follow-up rotation of the sleeve valve 75.

The other function of the gerotor mechanism 43 is to transmit a high-torque output to the output shaft 29. In order to accomplish this function, there is, in engagement with the internal splines 79 a set of crowned external splines 87 formed about one end of a main driveshaft 89 having, at its rearward end, another set of crowned external splines 91. The splines 91 are in engagement with a set of straight, internal splines 93 defined within the output shaft 29. Therefore, orbital and rotational movement of the star 47, in response to the flow of pressurized fluid through the gerotor 43, results in a relatively high-torque rotation of the output shaft 29.

Figure 5:
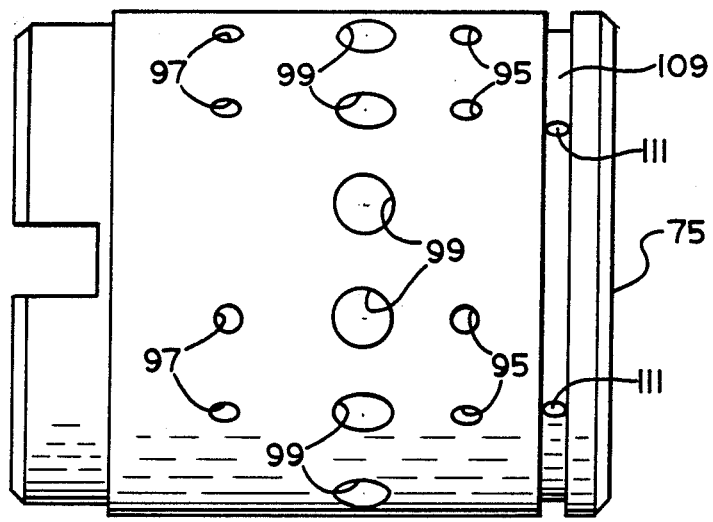

Referring now to FIG. 5, the sleeve valve 75 defines a plurality of pressure ports 95, which are positioned axially to be in continuous fluid communication with the annular groove 53, and therefore, with the inlet port 13. The sleeve valve 75 also defines a plurality of return ports 97 which are in continuous fluid communication with the annular groove 57, and therefore, with the outlet port 15. Finally, the sleeve valve 75 defines a plurality of meter ports 99, each of which is disposed to be in commutating fluid communication with the opening of each of the meter passages 61 into the valve bore 51. In the subject embodiment, because there are seven $(N+1)$ of the volume chambers 49, and therefore seven of the meter passages 61, there are 12 (two times N) of the meter ports 99. Furthermore, by way of example only, there are eight of the pressure ports 95 and eight of the return ports 97. As may be seen in FIG. 5, as well as in FIGS. 6 and 7, the center of each of the pressure ports 95 and return ports 97 is circumferentially aligned with the center of one of the meter ports 99.

Figure 4:
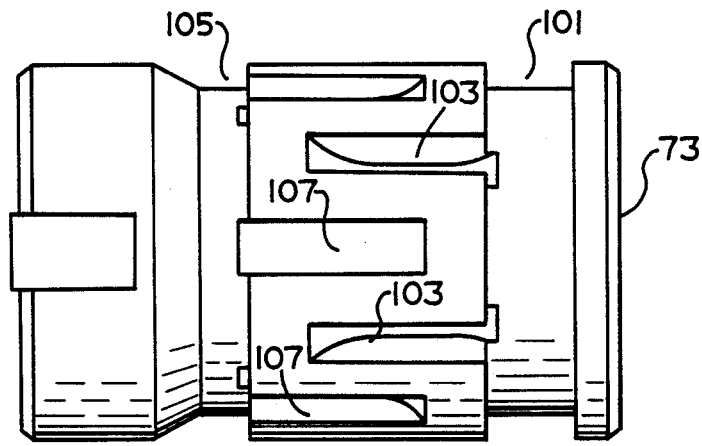
FIGS. 4 and 5 are enlarged, plan views of the spool valve member and sleeve valve member, respectively, of the torque-generating steering device of the present invention.

Referring now to FIG. 4, the spool valve 73 defines an annular groove 101, and in open communication therewith is a plurality of axial slots 103. Toward the forward end (left end in FIG. 4), the spool valve 73 defines another annular groove 105, and in open communication therewith, a plurality of axial slots 107.

It should be noted that the structure described thus far is generally well known in the torque generator art, except that in prior art torque generators which have all been open-center, the pressure ports 95 would be disposed further to the right in FIG. 5, in open communication with the annular groove 101, in much the same manner as the return ports 97 are in open communication with the annular groove 105. As was mentioned in the background of the present specification, it is an object of the present invention to provide a torque generator having the capability of providing the load-sensing signal 25 shown in FIG. 1 which may be utilized for varying the fluid output of the pump 19. In order for the torque generator of the present invention to provide a load-sensing signal, it is necessary for the valve means 71 to define a main, variable flow control orifice. Therefore, in accordance with one aspect of the present invention, the pressure ports 95 are disposed axially to the left (in FIGS. 4 and 5) of the annular groove 101, such that when the spool 73 and sleeve 75 are in their relative neutral position, fluid communication through the pressure ports 95 is blocked by the cylindrical, outer surface of the spool valve 73, i.e., the surface disposed between and around the interdigitated axial slots 103 and 107 (see FIG. 6).

Referring again to FIG. 5, the sleeve valve 75 defines an annular load-sensing groove 109 toward the right end of the sleeve. The sleeve 75 further defines a plurality of radial passages 111 which provide relatively unrestricted fluid communication between the annular groove 101 of the spool 73 and the load-sensing groove 109.

Figure 3:
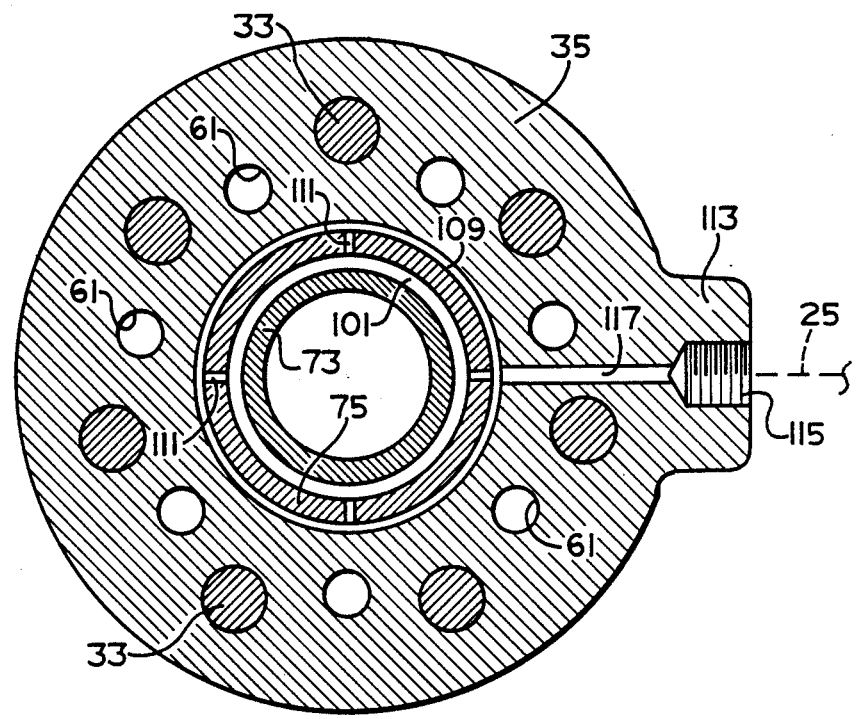
FIG. 3 is a transverse cross-section taken on line 3—3 of FIG. 2, and on the same scale.

Referring now to FIG. 3, the valve housing section 35 defines an enlarged boss portion 113 which extends to the right in FIG. 3 and defines a load-sensing port 115. The housing section 35 further defines a radial passage 117 providing relatively unrestricted fluid communication between the load-sensing groove 109 and the load-sensing port 115.

Operation

Figure 8:
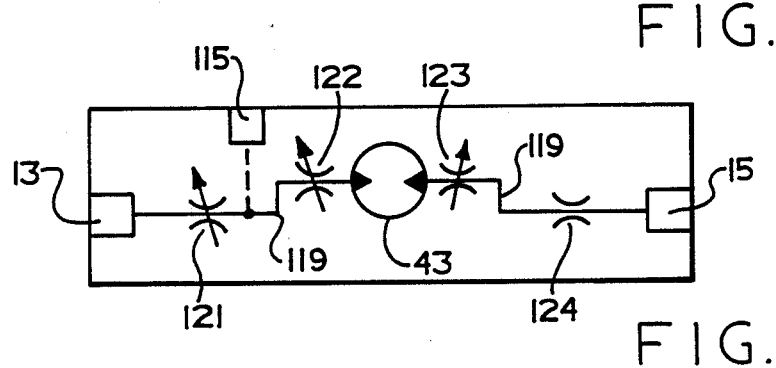
FIG. 8 is an orifice diagram, illustrating schematically the hydraulic circuit of the torque-generating steering device of the present invention.
Figure 6:
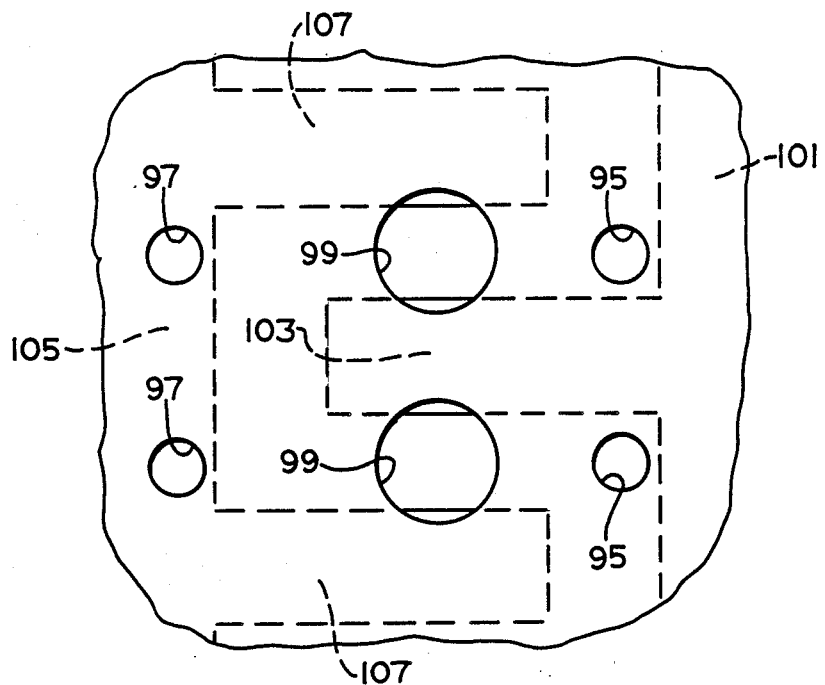
FIGS. 6 and 7 are enlarged, fragmentary layout views of the valving interface defined by the spool and sleeve valve members, illustrating the neutral and operating positions, respectively.
Figure 7:
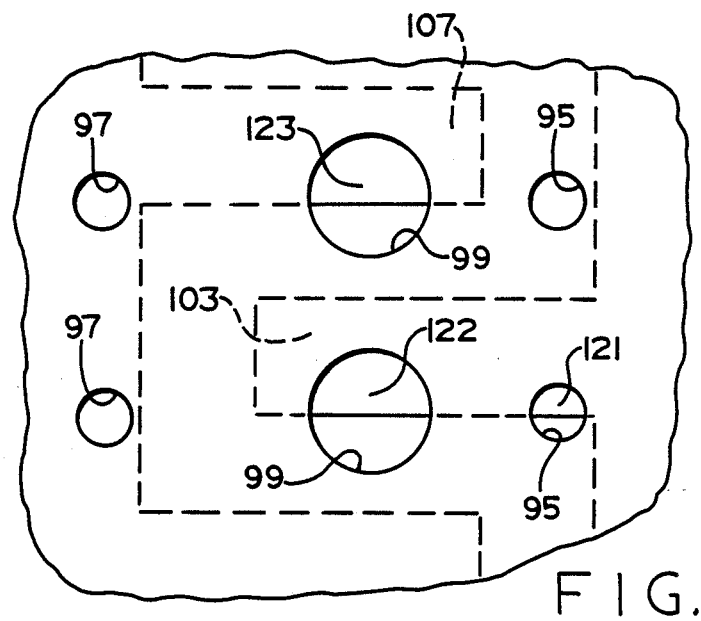

Referring now primarily to FIGS. 7 and 8, the operation of the torque generator 11 of the present invention will be described. When the vehicle operator rotates the steering wheel 31 in a clockwise direction, the spool valve 73 is rotated clockwise, relative to the sleeve valve 75, from the neutral position shown in FIG. 6 to an operating position shown in FIG. 7, wherein the valve housing section 35, sleeve valve 75, and spool valve 73 cooperate to define a fluid path 119 (see FIG. 8) which flows from the inlet port 13 through the gerotor 43 to the outlet port 15.

When the spool valve 73 is rotated to the operating position, in response to a relatively low-torque input to the input shaft 27, half of the pressure ports 95 begin to communicate with the adjacent axial slots 103, the cumulative area of overlap of the pressure ports 95 and axial slots 103 providing a main variable flow control orifice 121. The pressurized fluid in the axial slot 103, downstream of the orifice 121, flows into the adjacent meter port 99, with the cumulative area of overlap of those meter ports 99 and the axial slots 103 providing a second variable flow control orifice 122. The fluid which flows through the orifice 122 is then communicated through successive meter passages 61 to the expanding volume chambers 49 of the gerotor 43. This flow of pressurized fluid to the expanding volume chambers causes orbital and rotational motion of the star 47, which is then transmitted by means of the main drive shaft 89 into a relatively high-torque steering output of the output shaft 29.

Fluid which is exhausted from the contracting volume chambers 49 of the gerotor 43 is communicated back through successive meter passages 61 to those meter ports 99 which are in communication with the axial slots 107. The cumulative overlap of these particular meter ports 99 and the axial slots 107 provides a third variable flow control orifice 123. After flowing through the orifice 123, the low-pressure exhaust fluid flows through the axial slot 107 into the annular groove 105, then flows through the return ports 97. The cumulative area of overlap of the groove 105 and the return ports 97 provides a relatively large, fixed orifice 124. As is well known to those skilled in the art, rotation of the steering wheel 31 at a relatively constant speed and torque will achieve a certain displacement of the spool valve 73, relative to the sleeve valve 75 (such as that shown in FIG. 7), and the flow through the gerotor 43, and resulting follow-up movement transmitted to the sleeve 75 by means of the drive shaft 83 and pin 85, will maintain the relative displacement of the spool and sleeve.

With the spool valve 73 and sleeve valve 75 in the operating position illustrated in FIG. 7, the pressurized fluid in the axial slots 103 is representative of the steering load, i.e., the torque on the output shaft 29. The load pressure in the axial slots 103 is also present in the annular groove 101, and is communicated through the radial passages 111 into the load-sensing groove 109. The load pressure is then communicated through the radial passage 117 to the load-sensing port 115, from where it is communicated back to the compensator 23 of the pump 19 as described previously.

As is well known to those skilled in the general art of load-sensing valving, it is necessary to provide a fluid path to drain the entire load signal circuit whenever the valve returns to its neutral position, from an operating position. Draining the load signal circuit permits the pump to destroke to a relatively low-pressure, standby condition, thus minimizing the horsepower required to drive the pump. One important aspect of the present invention is to provide a drain path for the load-sensing circuit which is relatively simple, does not add to the overall size of the spool and sleeve valves, and utilizes only ports, slots, and passages which are already included in the valving, to perform other functions. Referring to FIG. 6, when the spool and sleeve are again in the neutral position, the load pressure fluid throughout the load-sensing circuit, described previously, is communicated through each of the axial slots 103 into each of the overlapping pressure ports 99. With each of the pressure ports 99 being large enough to communicate with both the axial slot 103 and the axial slot 107, the load pressure fluid flows into each of the slots 107, then into the annular groove 105. From the groove 105, the load pressure fluid flows through the return ports 97, and then to the outlet port 15, in the same manner as in the normal fluid path 119 when the spool and sleeve are in the operating position.

It will be understood by those skilled in the art that the load pressure signal 25 provided by the present invention may be utilized in ways other than to control the swash angle of a variable displacement pump, as shown in FIG. 1. The load signal 25 could be communicated to a load-sensing priority flow control valve in circuits of the type illustrated and described in U.S. Pat. No. 4,043,419, assigned to the assignee of the present invention, and incorporated herein by reference. As another example, the load signal 25 could be sensed, such as by means of a pressure transducer, with the resulting electrical pressure signal being utilized in a control circuit, such as to control the speed of operation of an electric motor used to drive the hydraulic pump, serving as the source of fluid to the torque generator.

The invention has been described in great detail, sufficient to enable one skilled in the art to make and use the same various alterations and modifications of the invention will occur to those skilled in the art upon a reading and understanding of the foregoing specification, and it is intended to include all such alterations and modifications as part of the invention, insofar as they come within the scope of the appended claims.

I claim:

1. A torque-generating steering device adapted to receive a relatively low-torque input and translate said input into a relatively high-torque steering output by means of a source of pressurized fluid having a fluid pressure responsive means for varying the fluid output of said fluid source; said steering device comprising housing means defining a fluid inlet port in fluid communication with said fluid source, and a fluid outlet port; fluid energy-translating displacement means associated with said housing means, and including a rotor member having relatively high-torque rotary motion in response to the flow of said pressurized fluid through said displacement means; valve means disposed in said housing means and having a neutral position and an operating position in which said valve means and said housing means cooperate to define a fluid path communicating pressurized fluid from said inlet port to said displacement means, and from said displacement means to said outlet port; input shaft means operable to transmit said relatively low-torque input into movement of said valve means from said neutral position to said operating position; follow-up means operable to transmit said rotary motion of said rotor member into follow-up movement of said valve means from said operating position toward said neutral position; output shaft means operable to transmit said relatively high-torque rotary motion of said rotor member into said relatively high-torque steering output; characterized by:
   (a) said fluid path including a main variable flow control orifice disposed in series flow relationship between said inlet port and said displacement means, said flow control orifice having a substantially zero flow area when said valve means is in said neutral position, and a maximum flow area when said valve means is in said operating position;
   (b) said housing means defining a load-sensing port adapted to be in fluid communication with said fluid pressure responsive means, said load-sensing port further being in fluid communication with said fluid path, downstream of said main variable flow control orifice; and
   (c) said valve means being configured to provide fluid communication between said load sensing port and said fluid outlet port when said valve means is in said neutral position.

2. A torque-generating steering device as claimed in claim 1 characterized by said valve means comprising a primary, rotatable valve member, and a relatively rotatable follow-up valve member, said primary valve member being fixed to rotate with said input shaft means, and said follow-up valve member receiving said follow-up movement.

3. A torque-generating steering device as claimed in claim 2 characterized by said primary valve member comprising a generally cylindrical spool valve member, and said follow-up valve member comprising a generally cylindrical sleeve valve member disposed radially between said spool valve member and said housing means.

4. A torque-generating steering device as claimed in claim 3 characterized by said housing means defining a plurality of meter passages providing fluid communication between said valve means and said displacement means, said housing means defining a generally cylindrical valve bore adapted to receive said sleeve valve member therein, said plurality of meter passages being in open communication with said valve bore at a plurality of circumferentially disposed locations.

5. A torque-generating steering device as claimed in claim 4 characterized by said sleeve valve member defining a plurality of meter ports, disposed to be in commutating fluid communication with said plurality of meter passages in response to rotation of said sleeve valve member.

6. A torque-generating steering device as claimed in claim 5 characterized by said sleeve valve member defining a plurality of pressure ports disposed toward one axial end of said sleeve valve member, from said meter ports, and further defining a plurality of return ports, disposed toward the other axial end of said sleeve valve member, from said meter ports.

7. A torque-generating steering device as claimed in claim 6 characterized by said pressure ports being in open, continuous fluid communication with said inlet port, and said return ports being in open, continuous fluid communication with said outlet port.

8. A torque-generating steering device as claimed in claim 7 characterized by said spool valve member defining a first plurality of axial slots, each of said first axial slots being disposed to provide fluid communication from one of said pressure ports to one of said meter ports when said valve means is in said operating position.

9. A torque-generating steering device as claimed in claim 8 characterized by said spool valve member defining a second plurality of axial slots, each of said second axial slots being disposed to provide fluid communication from one of said meter ports to one of said return ports when said valve means is in said operating position.

10. A torque-generating steering device as claimed in claim 8 characterized by said first axial slots and said pressure ports cooperating to define said main variable flow control orifice.

11. A torque-generating steering device as claimed in claim 10 characterized by said spool valve member defining a pressure annular groove in open fluid communication with said first axial slots, downstream of said first variable flow control orifice, and said sleeve valve member and said housing means cooperating to define an annular groove in open fluid communication with said load-sensing port, said sleeve valve member further defining passage means providing fluid communication between said spool annular groove and said sleeve annular groove.

12. A torque-generating steering device as claimed in claim 11 characterized by said first axial slots and said meter ports cooperating to define a second variable flow control orifice, and said second axial slots and said meter ports cooperating to define a third variable flow control orifice.

13. A torque-generating steering device as claimed in claim 12 characterized by at least one of said meter ports being in open fluid communication with one of said first axial slots, and with one of said second axial slots, simultaneously, when said valve means is in said neutral position, thereby providing fluid communication between said load-sensing port and said outlet port when said valve means is in said neutral position.

* * * * *